United States Patent [19]

Jenkins

[11] 3,859,242

[45] Jan. 7, 1975

[54] DECORATIVE COATINGS COMPRISING POLYETHYLENE GLYCOLS, NON-VITRIFIABLE FILLERS, AND EITHER POLYETHOXYLATED TERTIARY AMINES OR ALIPHATIC KETONES

[75] Inventor: Kennedy Areford Jenkins, Washington, Pa.

[73] Assignee: Hercules Incorporated, Wilmington, Del.

[22] Filed: May 16, 1974

[21] Appl. No.: 470,414

[52] U.S. Cl. ..... 260/32.6 R, 260/32.8 R, 117/124 E
[51] Int. Cl. ..... C08g 51/44, C08g 51/34, C03c 5/00
[58] Field of Search ................ 260/32.6 R, 32.8 R; 117/124 E

[56] References Cited
UNITED STATES PATENTS

| | | | |
|---|---|---|---|
| 3,310,512 | 3/1967 | Curtice | 117/124 E |
| 3,380,846 | 4/1968 | Murray | 117/124 E |
| 3,383,344 | 5/1968 | Gill | 260/32.8 R |
| 3,579,611 | 5/1971 | Holub | 117/124 E |
| 3,705,050 | 12/1972 | Smith | 117/124 E |

Primary Examiner—Morris Liebman
Assistant Examiner—Paul R. Michl
Attorney, Agent, or Firm—Hazel L. Deming

[57] ABSTRACT

Hot melt-type decorative coatings for glassware are described. The coatings contain 35 to 50 percent of a vehicle mixture of polyethylene glycols of different molecular weight ranges and at least one modifier and 65 to 50 percent of non-vitrifiable filler material which preferably contains at least one pigment.

5 Claims, No Drawings

DECORATIVE COATINGS COMPRISING POLYETHYLENE GLYCOLS, NON-VITRIFIABLE FILLERS, AND EITHER POLYETHOXYLATED TERTIARY AMINES OR ALIPHATIC KETONES

This invention relates to decorative coatings and particularly to decorative coatings for glass articles.

Enamel or ceramic coatings or glazes for glasses are known. Such coatings are produced by applying a mixture of a thermofluid vehicle and enamel color constituents to the object to be decorated and then firing the object to volatilize the vehicle and fuse the color to the object. Decorative coatings applied by firing techniques are firmly bonded to the substrate and have excellent durability.

Lightweight glassware and particularly bottles which are of low cost and hence suitable for one time use are also known. Bottles of this type, the so-called disposable bottles, like their heavier counterparts, are coated or decorated for identification purposes. The use of enamel or ceramic type coatings on disposable bottles, however, is not economically feasible. Attempts to offset bottle costs with an increase in product capacity has also not been successful. The chief disadvantage with large bottles is fragility, which imposes safety limitations on size and end use, and particularly uses which include the packaging and storing of carbonated beverages. Thus, there is a finite size limitation on disposable beverage bottles.

One approach to overcome the size limitation of disposable bottles concerns coating the bottle with a plastic film. The film coating is said to toughen and strengthen the bottle and, although it does not prevent breakage, to act as a bag to contain any fragments at the point of contact. Film coatings which are transparent provide see-through advantages and are not apparent until touched. The coatings also reduce noise level on the bottle handling line and reduce slip so that handling, carrying and pouring are more secure. Decoration of the bottle, either before or after coating with the film, however, is still required for identification purposes.

Now, in accordance with this invention, there is provided a decorative coating which does not require firing for application to glass articles. The coating provides clear, sharp, adherent, decorative images on glass, is sag and mar resistant and can be top coated with film-forming plastics conventionally without detriment to the decoration. Additionally, the decorative coatings of this invention are inert and nonexuding and do not adversely effect the protective properties of polymeric films applied thereover.

Accordingly, the present invention relates to a decorative coating having a melt viscosity at 93°C. of at least 10,000 cps, said coating consisting essentially of by weight (a) 35 to 50 percent of a vehicle having a melt softening point range from about 40°C. to about 65°C. and (b) 65 to 50 percent of a particulate, non-vitrifiable filler material intimately dispersed in said vehicle, said vehicle comprising by weight 50 to 94 percent of at least one polyethylene glycol having an average molecular weight ranging from about 2,500 to about 4,500, 5 to 40 percent of at least one polyethylene glycol having an average molecular weight ranging from about 10,000 to about 20,000, and 1.0 to 10 percent of at least one, normally solid modifier compatible with said polyethylene glycols and selected from the group consisting of polyethoxylated tertiary amines of the formula

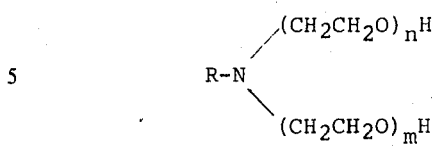

where R is a long-chain aliphatic hydrocarbon group having from 12 to 22 carbon atoms and n and m are integers of at least one and have a sum greater than 8, and aliphatic ketones containing from 15 to 43 carbon atoms.

As stated, the coating of the invention consists essentially of filler and a vehicle which contains specified amounts of certain polyethylene glycols having molecular weights within two different ranges and at least one modifier as defined. Polyethylene glycols having the recited molecular weights are available commercially as the Carbowax polyethylene glycols (Union Carbide Corp.), and as polyethylene glycols (Dow Chemical Co. and Matador Chemical Co.). The polyethylene glycols are normally solid polymers having melt-softening points ranging from about 42°C. to about 64°C. The polyethylene glycols having molecular weights of about 2,500 to about 4,500 have melt viscosities at 99°C. ranging from about 65 to about 95 cps. and the polyethylene glycols having an average molecular weight of about 10,000 to about 20,000 have melt viscosities at 99°C. of about 75,000 to about 110,000 cps.

The vehicle, as stated, also contains at least one modifier of a specified type which is a solid at normal room temperature (about 25°C.) and compatible with the polyethylene glycol components of the vehicle. The modifiers which are useful in this invention are waxy or resinous solids and are polyethoxylated tertiary amines and/or aliphatic ketones. The polyethoxylated tertiary amine modifiers are represented by the formula

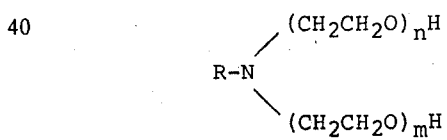

where R is a long-chain aliphatic hydrocarbon group containing from 12 to 22 carbon atoms and $n$ and $m$ are integers of at least one and have a sum greater than 8. Examples of aliphatic hydrocarbon groups coming within the definition include dodecyl, tetradecyl, hexadecyl, octadecyl, octadecenyl, octadecadienyl and octadecatrienyl. R can also be a statistical mixture of the foregoing aliphatic hydrocarbon groups, as is present in natural occurring fats and oils such as tallow, soybean oil, cottonseed oil, coconut oil and the like from which they are obtained. Preferred polyethoxylated tertiary amines contain a long-chain alkyl group containing an average of 16 to 20 carbon atoms and 12 to 16 moles of ethylene oxide, i.e., the sum of $n$ and $m$ equals 12 to 16. Particularly preferred is an ethoxylated amine containing an average of 18 carbon atoms in the alkyl group and 12 moles of ethylene oxide, as is available commercially from Armour Industrial Chemical Co. under the Ethomeen tradename with the code designation of 18/12.

The aliphatic ketones have melting points above 40°C. and contain from 15 to 43 carbon atoms. Exemplary of suitable ketones are di-n-heptyl ketone, di-n- octyl ketone, di-n-nonyl ketone, di-n-decyl ketone, di-n-undecyl ketone (laurone), di-n-tridecyl ketone, di-n-heptadecyl ketone (stearone), methyl heptadecyl ketone and the like. Particularly useful are the ketones containing 23 to 35 carbon atoms and specifically laurone and stearone.

Particularly preferred are vehicles which contain, by weight, 60 to 89 percent of a polyethylene glycol component of molecular weight about 2,500 to about 4,500, 10 to 35 percent of a polyethylene glycol component of molecular weight about 10,000 to about 20,000 and 1 to 5 percent of at least one of the specified modifiers. Other modifiers in small amounts, preferably less than 5 percent by weight of the vehicle can also be present provided, of course, they do not detract from any of the advantages of the invention. Preferred modifiers of this type include paraffin wax, low molecular weight polyethylene, and low molecular weight polystyrene. The use of more than about 5 percent of the other modifiers, however, is not recommended. Particularly preferred is a vehicle composition containing 74 to 89 percent of polyethylene glycol of molecular weight 2,500–4,500, 10 to 20 percent of polyethylene glycol of molecular weight 10,000–20,000, 0.5 to 3 percent of stearone, 0.5 to 3 percent of Ethomeen 18/12 and 0 to 3 percent of polystyrene having a molecular weight of about 300 to about 400.

The coatings of this invention also contain from 65 to 50 percent of particulate non-vitrifiable filler material. By filler material is meant any inert inorganic or organic solid or mixture of solids which can be finely-divided, usually to a particle size less than about 5 microns, is insoluble in the vehicle and is not vitrifiable. Typical fillers include silica, talc, gypsum, calcium carbonate, alumina, titanium dioxide, dolomite, aluminum silica, calcium silicate, sodium potassium aluminum silicate, and the like, as well as mixtures of any of the above or mixtures with colored inorganic or organic pigments. Typical pigments include lead chromate, iron oxide, zinc oxide, titanium dioxide, the cadmium yellows or reds, the copper phthalocyanines, the Diarylide Yellows, the Rubine Toners such as Aztec Red and the like. Preferably, the filler will contain from about 1 to about 25 percent of at least one pigment. Other materials such as dyes can be present in the filler to provide a desired effect. The amount of filler in the coating, as stated, can range from 65 to 50 percent. Amounts above and below the range recited give coatings which sag, mar or do not print well on glass and thus are unsuitable for decorative purposes.

The coatings of the invention are of the hot melt or thermofluid type and can be prepared conventionally by mixing the vehicle components together at above the melting point of the components and dispersing the filler material therein while the vehicle is molten, using, for example, a Morehouse mill, a Groen mixer or similar mixing devices. The coatings can also be prepared by premixing the ingredients and passing the premix through a three roll paint mill.

The coatings of this invention are suited for decorative application to glass and similar substrates and particularly to glassware which is to be top coated with a film-forming polymer. The decorative coating can be applied to the surface of an object conventionally, as through a screen stencil by means of a squeegee process, at a temperature above the melting point of the vehicle. If, as is usually the case, the surface of the object is maintained at or near room temperature, the coating will set immediately and produce a mark-free, adherent design on the object. A plurality of coatings in a color, design or registry can be superimposed upon each other immediately, as by overprinting. Following decoration the object can be topcoated with a film, if desired. In the case of bottles, uniform, thin film top coatings can be achieved using such basic coating techniques as the fluidized bed dip process, an electrostatic fluidized bed or an electrostatic spray gun. For dipping, the bottle should be preheated so that a 2–3 seconds of contact with the fluidized particles during immersion results in contact fusion and pickup of sufficient powder to flow out to a 4 mils or greater film thickness. For both electrostatic processes, the powdered polymer is charged negatively and deposited by electrostatic attraction onto warmed bottles which are rotating slowly. Fusion of the powder is carried out conventionally as by tuned infrared heating, heating in a hot air oven, or the like, and the coating set to a solid state by cooling in air and/or water.

Suitable film-forming polymers include the high molecular weight thermoplastic resins such as the polyolefins, particularly polyethylene and polypropylene, the polyesters and particularly polyethylene terephthalate, the polyamides, polymers of vinyl chloride, copolymers of ethylene with acrylic esters and/or acrylic acids, and the like. Particularly preferred are the ionic polymers based on ethylene and containing carboxyl groups located along the polymer chain, as for example, the copolymers of ethylene and a small amount of sodium methacrylate and methacrylic acid. The ionic polymers are available under the Surlyn trademark (du Pont).

The invention is further illustrated by reference to the following example in which all parts and percentages are by weight unless otherwise specified.

EXAMPLE

A vehicle was prepared by stirring at 110°C. until homogeneous 60 parts of a polyethylene glycol having a molecular weight of about 3,000 to about 3,700 (Carbowax 4000), 10 parts of a polyethylene glycol having a molecular weight of about 15,000 (Carbowax 20M), 1.0 part of stearone and 1.0 part of the polyethoxylated tertiary amine condensation product of a primary alkyl amine containing an average of 18 carbon atoms in the alkyl group with 12 moles of ethylene oxide (Ethomeen 18/12).

Twenty parts of the above vehicle were mixed with 25 parts of potassium sodium aluminum silicate, (Minex No. 7) and 4 parts of titanium dioxide at 110°C. to give a white color (A).

Twenty parts of the above vehicle were mixed with 21 parts of Minex No. 7, 2 parts of Aztec Red toner and 0.75 part of titanium dioxide at 110°C. to give a red color (B).

The white color (A) was heated to 75°C. and applied as a decorative coating on the shoulder and on the body of a 48 oz. size disposable-type glass bottle by metal screen printing. The white decoration on the bottle shoulder and body were overprinted in part with red color (B) applied at 75°C. by metal screen printing in a different design. The final decoration in a red and white design was clear, sharp and free of irregularities and screen marks.

The multicolor decorated bottle was then top coated with a film of a high molecular weight ionic copolymer of ethylene containing a small amount of sodium methacrylate and methacrylic acid and having a melt flow index (ASTM D1238-627) of about 20 dg/min. (Surlyn AD 5001). The top coating was applied to the decorated bottle by preheating the bottle to 205°C. and immersing the preheated bottle in a fluidized bed of 10 to 80μ particles of the copolymer, following which the coating was fused at 205°C. and the coated bottle was cooled first in air and then in water. The top coating was a transparent film which covered all of the bottle surfaces up to the finish of the bottle. The decoration was completely visible through the top coating and was as clear and sharp as a decoration which had not been top coated. After storage of the bottle for 3 weeks, there was no evidence of color bleed through into the top coating or deterioration of the decoration or the top coating.

What I claim and desire to protect by Letters Patent is:

1. A decorative coating having a melt viscosity at 93°C. of at least 10,000 cps., said coating consisting essentially of by weight
    a. 35 to 50 percent of a vehicle having a melt softening point range from about 40°C. to about 65°C. and
    b. 65 to 50 percent of a particulate, non-vitrifiable filler material intimately dispersed in said vehicle, said vehicle comprising by weight 50 to 94 percent of at least one polyethylene glycol having an average molecular weight ranging from about 2,500 to about 4,500, 5 to 40 percent of at least one polyethylene glycol having an average molecular weight ranging from about 10,000 to about 20,000, and 1 to 10 percent of at least one, normally solid modifier compatible with said polyethylene glycols and selected from the group consisting of polyethoxylated tertiary amines of the formula

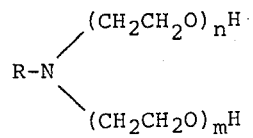

where R is a long-chain aliphatic hydrocarbon group having from 12 to 22 carbon atoms and $n$ and $m$ are integers of at least 1 and have a sum greater than 8, and aliphatic ketones containing from 15 to 43 carbon atoms.

2. The coating of claim 1 wherein said modifier is a mixture of equal parts of stearone and a polyethoxylated tertiary amine of said formula wherein R is an alkyl group containing an average of 18 carbon atoms and the sum of $n + m$ equals 12.

3. The coating of claim 2 wherein said vehicle comprises 75 to 89 percent of a polyethylene glycol having an average molecular weight of about 2,500 to about 4,500 and 10 to 20 percent of a polyethylene glycol having an average molecular weight of about 10,000 to about 20,000.

4. The coating of claim 3 wherein said filler material contains from about 5 to about 25 percent based on the weight of the filler material of at least one pigment.

5. The coating of claim 4 wherein the vehicle also contains up to 3 percent of polystyrene having a molecular weight of about 300 to about 400.

* * * * *